United States Patent [19]
Sentz et al.

[11] Patent Number: 5,898,728
[45] Date of Patent: Apr. 27, 1999

[54] DISTRIBUTED ANALOG-DIGITAL FREQUENCY DEHOPPING SYSTEM

[75] Inventors: Donald R. Sentz, Beverly Hills; Vincent C. Moretti, Torrance, both of Calif.

[73] Assignee: TRW Inc., Redondo Beach, Calif.

[21] Appl. No.: 08/755,521

[22] Filed: Nov. 22, 1996

[51] Int. Cl.$^6$ ............................. H04B 15/00; H04K 1/00; H04L 27/30; H04J 1/00

[52] U.S. Cl. ........................ 375/202; 375/202; 375/200; 370/343; 370/480; 455/59

[58] Field of Search ................................. 375/202, 200, 375/201; 370/342, 343, 479, 480; 455/59

[56] References Cited

U.S. PATENT DOCUMENTS

| | | |
|---|---|---|
| 4,267,592 | 5/1981 | Craiglow . |
| 4,454,604 | 6/1984 | Myers . |
| 4,457,003 | 6/1984 | Reed ........................................ 375/202 |
| 4,468,788 | 8/1984 | Stoneburner . |
| 4,606,041 | 8/1986 | Kadin ...................................... 375/202 |
| 4,630,282 | 12/1986 | Landers et al. . |
| 4,638,493 | 1/1987 | Bishop et al. . |
| 4,761,796 | 8/1988 | Dunn et al. ............................. 375/202 |
| 4,914,699 | 4/1990 | Dunn et al. . |
| 5,126,682 | 6/1992 | Weinberg et al. . |
| 5,166,953 | 11/1992 | Hershey et al. ......................... 375/202 |
| 5,347,284 | 9/1994 | Volpi et al. . |
| 5,440,636 | 8/1995 | Herrick . |

FOREIGN PATENT DOCUMENTS 2 118 401   3/1982   United Kingdom .

OTHER PUBLICATIONS

K. Defly, X. Wang, G. Wu, M. Lecours, "Synchronization in FH–MFSK Spread Spectrum Systems", IEEE 38th Vehicular Technology Conference, Jun. 15, 1988.

Primary Examiner—Stephen Chin
Assistant Examiner—Michael W. Maddox
Attorney, Agent, or Firm—Michael S. Yatsko

[57] ABSTRACT

A system and method for frequency dehopping of spread spectrum communication signals includes a downconverter having two mixer stages, each mixer stage providing coarse frequency dehopping. The local oscillator injection frequency of each mixer stage is selectable by way of a plurality of relatively easily generated tones. The output of the second mixer stage is sampled by an analog-to-digital converter to enable fine tuning dehopping to be performed in the digital domain and subsequently demodulated in a demodulator circuit.

14 Claims, 4 Drawing Sheets ional object of the present invention to provide

DISTRIBUTED ANALOG-DIGITAL FREQUENCY DEHOPPING SYSTEM

BACKGROUND OF THE INVENTION

1. Field of the Invention

The present invention relates to a system and method for downconverting the frequency of a communication signal, and more particularly to a system for frequency dehopping spread spectrum communication signals, the system including a receiver which includes a downconverter, with two mixer stages, each mixer stage providing coarse frequency dehopping of the input communication signal, wherein the local oscillator injection of each mixer stage is selectable from a plurality of tones, the output of the two mixer stages being sampled by an analog to digital converter to enable fine dehopping of the communication signal to be performed digitally.

2. Description of the Prior Art

Spread spectrum communication systems are known in the art. Such communication systems are normally used for secured communication in both military and satellite applications. Examples of such spread spectrum communication system are disclosed in U.S. Pat. Nos. 4,267,592; 4,630,282; 4,761,796; 4,914,699; 5,126,682; and 5,440,636.

Various spread spectrum communication techniques are known, such as direct sequence and frequency hopping. In direct sequence spread systems, a pseudo-noise signal, such as Gold code is employed. In particular, the pseudo-noise signal consists of a pseudo-random binary signal that is multiplied by the original base band bitstream to produce a new bitstream. In frequency hopping systems, the carrier or center frequency of the signal simply jumps to a number of different frequencies in a agreed upon pseudo-random binary sequence.

In both techniques, only those receivers which have the correct pseudo-random binary sequence can decode the original information. In order for a receiver to decode the information in a spread spectrum communication signal, the time sequential frequency pattern of the receiver is synchronized with the transmitter. In particular, once the receiver is synchronized with the transmitter, the spread spectrum signal is despread and subsequently demodulated to extract the original information from the spread spectrum signal. Despreading, also known as frequency dehopping, is usually done in the receiver by injecting a local oscillator signal to convert the spread spectrum signal into a signal having a frequency bandwidth sufficient to extract the information. Once the spread spectrum signal is despread or frequency dehopped, the desired information is extracted by well known demodulation techniques.

As mentioned above, spread spectrum communications systems are known to be used in satellites. In many such satellite systems, the weight allocation of the equipment in the satellite is a design constraint. In known receivers used in such satellites systems, frequency dehopping is accomplished in a single mixer stage with the local oscillator injection coming from one of a set of hopping frequency synthesizer units. The local oscillator signals from such synthesizers units are known to be routed through a relatively heavy and complex matrix switch in order to achieve key (or hopping pattern) to beam connectivity. Since the local oscillator signals in such a system can be in the 13 GHz region, the line losses in the coaxial cables and the switch matrix must be compensated by providing a high power output from each synthesizer unit. Moreover, the synthesizers used in such systems are required to have relatively high spectral purity requirements which increase the complexity and weight of such synthesizers.

SUMMARY

It is an object of the present invention to solve various problems of the prior art.

It is yet another object of the present invention to provide a method for frequency dehopping a spread spectrum communication signal which eliminates the need for relatively heavy and complex matrix switches.

It is yet another object of the present invention to provide a method for dehopping a spread spectrum communication signal which eliminates the need for dehopping synthesizer units.

Briefly, the present invention relates to a system and method for frequency dehopping of spread spectrum communication signals and more particularly to a spread spectrum receiver which includes a downconverter and a demodulator. The downconverter includes two mixer stages, each mixer stage providing coarse frequency dehopping. The local oscillator injection frequency of each mixer stage of the downconverter is selectable by way of a plurality of relatively easily generated tones. The output of the second mixer stage is sampled by an analog-to-digital converter to enable fine dehopping to be performed in a third stage in the digital domain.

BRIEF DESCRIPTION OF THE DRAWING

These and other objects and advantages of the present invention will become readily ensued with reference to the following specification and attached drawing, wherein.

DETAILED DESCRIPTION

The present invention relates to a spread spectrum distributed analog-digital dehopping system in which frequency dehopping of an incoming spread spectrum communication signal is dehopped in three stages. In particular, the system includes a downconverter which includes two cascaded mixer stages, each of which performs coarse analog dehopping of the incoming spread spectrum communication signal. The output of the cascaded mixer stages is sampled by an analog to digital (A-D) converter which enables fine dehopping to be performed digitally in a third stage. An important aspect of the invention is that each of the mixer stages of the downconverter includes a plurality of tone generators for generating various tone frequencies, selectable to enable the residual hopping bandwidth at each stage to be reduced. The tone generators are sufficiently simple to be integrated into the downconverter electronics, thereby eliminating the need for matrix switches. Fine dehopping is implemented digitally in the third stage of the downconverter obviating the need for a digital to analog converter normally used in known systems. Moreover, hopper synthesizer units, local oscillator switch matrix units as well as many coaxial cable routings are eliminated from the known designs, thus reducing the overall weight of the system of multiple receivers using multiple hopping patterns.

Figure 1:
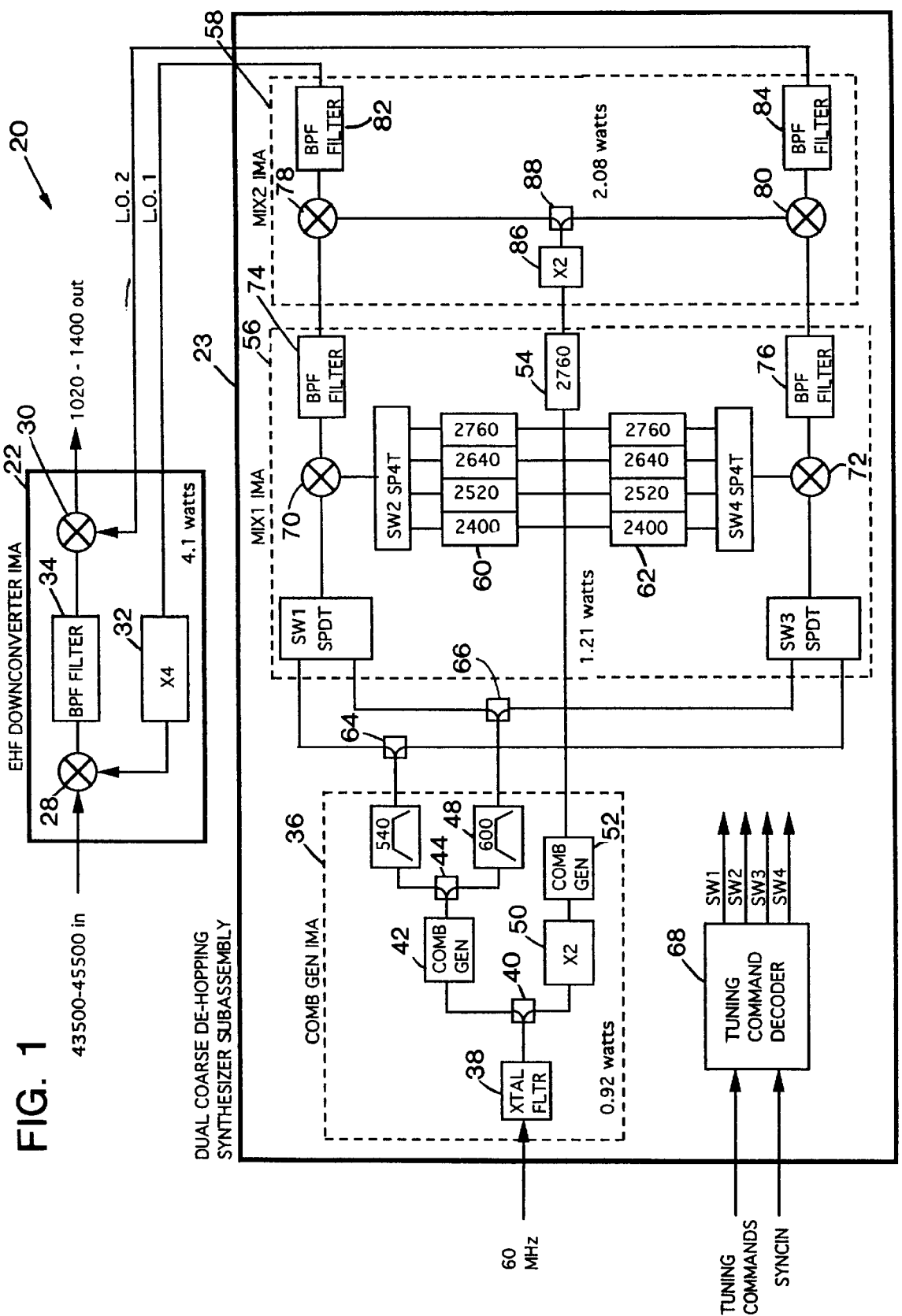
FIG. 1 is a block diagram of a two stage downconverter which forms a portion of an integrated receiver in accordance with the present invention.

Referring to FIG. 1, a two stage downconverter, generally identified with the reference numeral 20, is illustrated. The downconverter 20 along with an analog digital converter 24, a digital frequency dehopping circuit 26 and a demodulation circuit 27 (FIG. 2) form an integrated receiver for receiving spread spectrum communication signals, for example, in the EHF range of 43,500–45,500 MHz. The first two stages of the downconverter provide a dehopped analog output signal in the range of 1200–1400 MHz which, as will be discussed in more detail below, is applied to the analog-to-digital converter 24 and, in turn, to the digital frequency dehopping circuit 26 where fine dehopping is performed. Signal extraction is accomplished by way of the demodulation circuit 27. As will be appreciated by those of ordinary skill in the art, the downconverter 20 is also applicable to non-hopping multi-channel wide band microwave receiving applications.

The downconverter 20 includes a two stage mixer. A dual coarse dehopping synthesizer circuit 23 provides a plurality of selectable local oscillator injection frequencies to each of the mixer stages of the down convertor 20 to provide coarse dehopping of the incoming spread spectrum communication signal. In particular, the downconverter 22, includes a first mixer stage 28 and a second mixer stage 30. The input spread spectrum signal, for example, an EHF communication signal in the range of 43,500–45,500 MHz, is applied to the input of the first mixer stage 28. A first local oscillator signal L.O.1 from the dual coarse dehopping synthesizer circuit 23 is applied to the first mixer stage 28 by way of a frequency multiplier 32, for example a model no. XSH107C, as manufactured by TRW Inc. The frequency multiplier 32 multiplies the incoming first oscillator signal L.O.1, by 4 and mixes it with the incoming spread spectrum communication signals to generate a first intermediate frequency (IF). The second mixer stage 30 is cascaded to the first mixer stage 28 by way of a band pass filter 34. The bandcpass filter 34 is used to eliminate unwanted frequency signals from the first mixer stage 28. The second mixer stage 30 is used to synthesize the first intermediate frequency with a second local oscillator signal L.O.2 from the dual coarse dehopping synthesizer circuit 23 to generate a second intermediate frequency.

Figure 3:
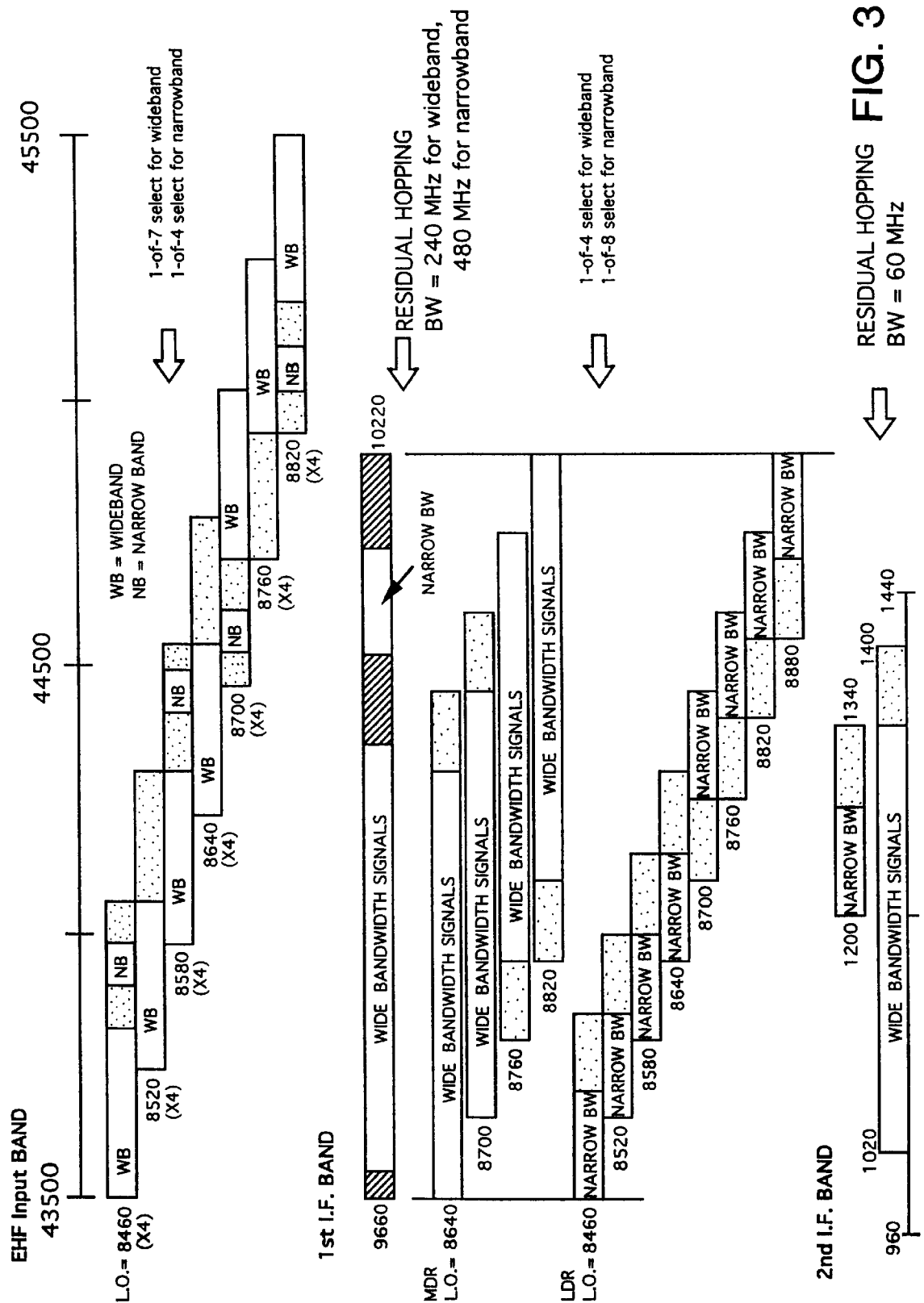
FIG. 3 represents spectral representation of the bandwidth as well as the selectable local oscillator injection frequencies for each stage of the two stage downconverter in accordance with the present invention.

As will be discussed in more detail below, the local oscillator injection frequency for both the first mixer stage 28 and the second mixer stage 30 is selectable to enable the residual hopping frequency at both the first intermediate frequency (i.e. the output of the first mixer stage 28) as well as the second intermediate frequency (i.e. the output of the second mixer stage 30) to be reduced by providing selectable local oscillator frequencies. More particularly, the system is adapted to receive wide bandwidth signals as well as narrow bandwidth signals. As shown in FIG. 3 for the first IF stage, the bandwidth for residual hopping is 240 MHz for wideband signals and 480 for narrowband signals. For the second IF stage, the bandwidth for the residual hopping for both types of signals is further reduced to 60 MHz.

A dual coarse dehopping synthesizer circuit 23 controls the local oscillator frequencies L.O.1 and L.O.2 for each of the mixer stages 28 and 30 of the downconverter 20. The dual coarse dehopping synthesizer circuit 23 includes a comb generator circuit 36. The comb generator circuit 36 is used to generate the 540 MHz, 600 MHz as well as 2760 MHz reference signals used to generate the local oscillator signals L.O.1 and L.O.2 for the first mixer stage 28 and the second mixer stage 30. The comb generator circuit 36 includes a first comb generator 42, for example, Model No. RGC-01 as manufactured by TRW Inc. whose output, in turn, is applied to another signal splitter 44 and, in turn, to comb filters 46 and 48, for example, like Model No. 916825 as manufactured by Integrated μ to generate 540 MHz and 600 MHz reference signals, respectively. A reference source of 60 MHz is applied to the comb generator circuit 36. The 60 MHz reference signal is applied to a crystal filter 38. The output of the crystal filter, in turn, is applied to a signal splitter 40, to split the signal between a comb generator 42 and a frequency multiplier 50. The output of the signal splitter 40 is applied to a frequency multiplier 50, for example, Model No. DCLNA as manufactured by TRW Inc. which doubles the frequency of the incoming reference 60 MHz signal. The output of the frequency multiplier 50, in turn, is applied to a second comb generator 52 which, in turn, is used to generate a 2760 MHz tone, identified by the block 54. As will be discussed in more detail, the 540, 600 and 2760 MHz reference signals are used for generating the local oscillators signals L.O.1 and L.O.2 for the first mixer stage 28 and second mixer stage 30 of the downconverter 22.

The dual coarse dehopping synthesizer circuit 23 includes a first synthesizer stage 56 and a second synthesizer stage 58. The first synthesizer stage 56 is cascaded to the second synthesizer stage 58. The output of the second synthesizer stage provides the local oscillator signals L.O.1 and L.O.2 to the first and second mixer stages 28 and 30, respectively, of the downconverter 22.

The first synthesizer stage 56 of the dual coarse dehopping synthesizer circuit 23 includes a plurality of single pole double throw switches SW1 and SW3, for example, Model No. NASW-6010 as manufactured by MA-COM as well as two single pole four throw (SP4T) switches SW2 and SW4, for example, Model No. MASW-4000 as manufactured by MA-COM. The switches SW2 and SW4 are connected to a pair of relatively simple tone generators 60 and 62 respectively, which use SBAR (Surface Bulk Acoustic Resonator) technology manufactured by TRW Inc. Each of the tone generators 60 and 62, for example, is adapted to selectively generate 4 tones having frequencies of 2400 MHz, 2520 MHz, 2640 MHz and 2760 MHz. As will be discussed below, the frequency of the tones from the tone generator 60 and 62 are mixed with the 540 MHz, 600 MHz, and 2760 MHz signals from the comb generator circuit 36 to provide the local oscillator signals L.O.1 and L.O.2 as illustrated in FIG. 3.

The 540 MHz and 600 MHz signals from the comb generator circuit 36 are applied to a pair of signal splitters 64 and 66, respectively. The signal splitters 64 and 66 allow the 540 MHz and 600 MHz signals to be applied to both of the switches SW1 and SW3. The switches SW1 and SW2 are used to generate the selectable local oscillator signal L.O.1, while the switches SW3 and SW4 are used to provide the local oscillator signal L.O.2 for the first and second mixer stages 28 and 30, respectively, of the downconverter 22. The switches SW1, SW2, SW3 and SW4 are under the control of a tuning command decoder 68. Tuning commands from the transmission security subsystem, and a sync signal from the master time epoch reference source are applied to the input of the tuning command decoder 68 in order to control configuration of the four switches, SW1, SW2, SW3 and SW4 which, in turn, control the local oscillator injection frequencies L.O.1 and L.O.2 to the downconverter 22 as illustrated in FIG. 3.

The first synthesizer stage 56 of the dual coarse dehopping synthesizer circuit 23 includes a first mixer 70 and a second mixer 72. The switches SW1 and SW3 are applied to the inputs of the first mixer 70 and second mixer 72 to enable either the 540 MHz or 600 MHz signals to be synthesized with signals from the tone generators 60 and 62 respectively. In particular, each of the tone generators 60 and 62, as shown, for example, have a capability of generating tone signals at 2400 MHz, 2520 MHz, 2640 MHz and 2760 MHz. These tone signals are separately applied to the mixers 70 and 72 by way of the switches SW2 and SW4, respectively. The outputs of the first mixer 70 and second mixer 72 are applied to a pair of band pass filters 74 and 76, respectively, to filter out unwanted synthesizer products. The output of the bandpass filters 74 and 76, in turn, are applied to a pair of mixers 78 and 80, respectively, in a second synthesizer stage 58 of the dual coarse dehopping synthesizing circuit 23.

The output of the second synthesizer stage 58 and, in particular, the mixers 78 and 80 are, in turn, applied to bandpass filters 82 and 84, respectively, to form the local oscillator injection signals L.O.1 and L.O.2 for the downconverter 22. The band pass filters 82 and 84 are used to filter out unwanted outputs from the mixers 78 and 80. The output of the first mixer stage 56 is synthesized with a 5520 MHz signal in the second synthesizer stage 58. The 5520 MHz signal is generated by way of the 2760 MHz signal from the comb generator 52 applied to a frequency multiplier 86. The output of the frequency multiplier 86 is applied to a signal splitter 88 and, in turn, applied to each of the mixers 78 and 80 in the second synthesizer stage 58 of the dual coarse dehopping synthesizer circuit 23.

The local oscillator signal L.O.1 is under the control of the switches SW1 and SW2. When the switch SW1 is configured such that the 540 MHz signal is applied to the mixer 70, the 2400 MHz, 2520 MHz, 2640 MHz and 2760 MHz may be mixed with the 540 MHz signal by way of the mixer 70 and switch SW2 to provide four selectable narrowband local oscillator frequencies of 8460 MHz, 8580 MHz, 8700 MHz and 8820 MHz, respectively, at the input of the frequency multiplier 32. By configuring the switch SW1 to connect the 600 MHz signal from the comb generator 36 to the mixer 70, an additional three local oscillator signals at 8520 MHz, 8640 MHz and 8760 MHz are generated to provide for a one out of seven selectable local oscillator frequency for wideband signals, or a one out of four selectable local oscillator frequency for narrowband signals for the local oscillator L.O.1.

The local oscillator signal L.O.2, applied to the second mixer stage 30 of the downconverter 22, is under the control of the switches SW3 and SW4. When the switch SW3 is configured so as to apply the 540 MHz signal from the comb generator 36 to the mixer 72, the tone generator 62 and the switch SW4 may be used to generate local oscillator frequencies of 8460 MHz, 8580 MHz, 8700 MHz and 8820 MHz. When the switch SW3 is configured to apply the 600 MHz signal to the mixer 72, the tone generator 62 and the switch SW4 may be used to provide local injection oscillator frequencies for the local oscillator L.O.2 at 8520 MHz, 8640 MHz, 8760 MHz and 8880 MHz to provide one out of four selectable local oscillator frequencies for wideband signals and one out of eight narrowband local oscillator frequencies for narrowband signals for the local oscillator signal L.O.2, which is applied to the second stage 30 of the down convertor 22.

Figure 2:
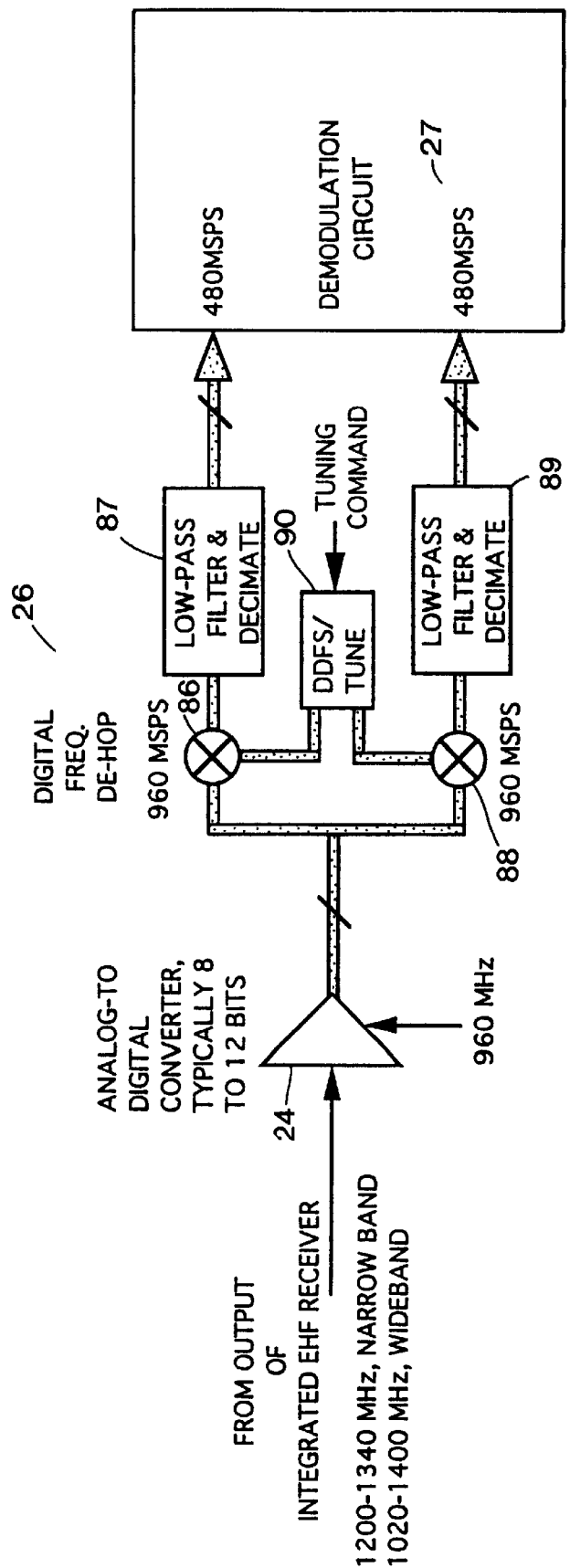
FIG. 2 is a block diagram of a third stage of the integrated receiver in accordance with the present invention.
Figure 4:
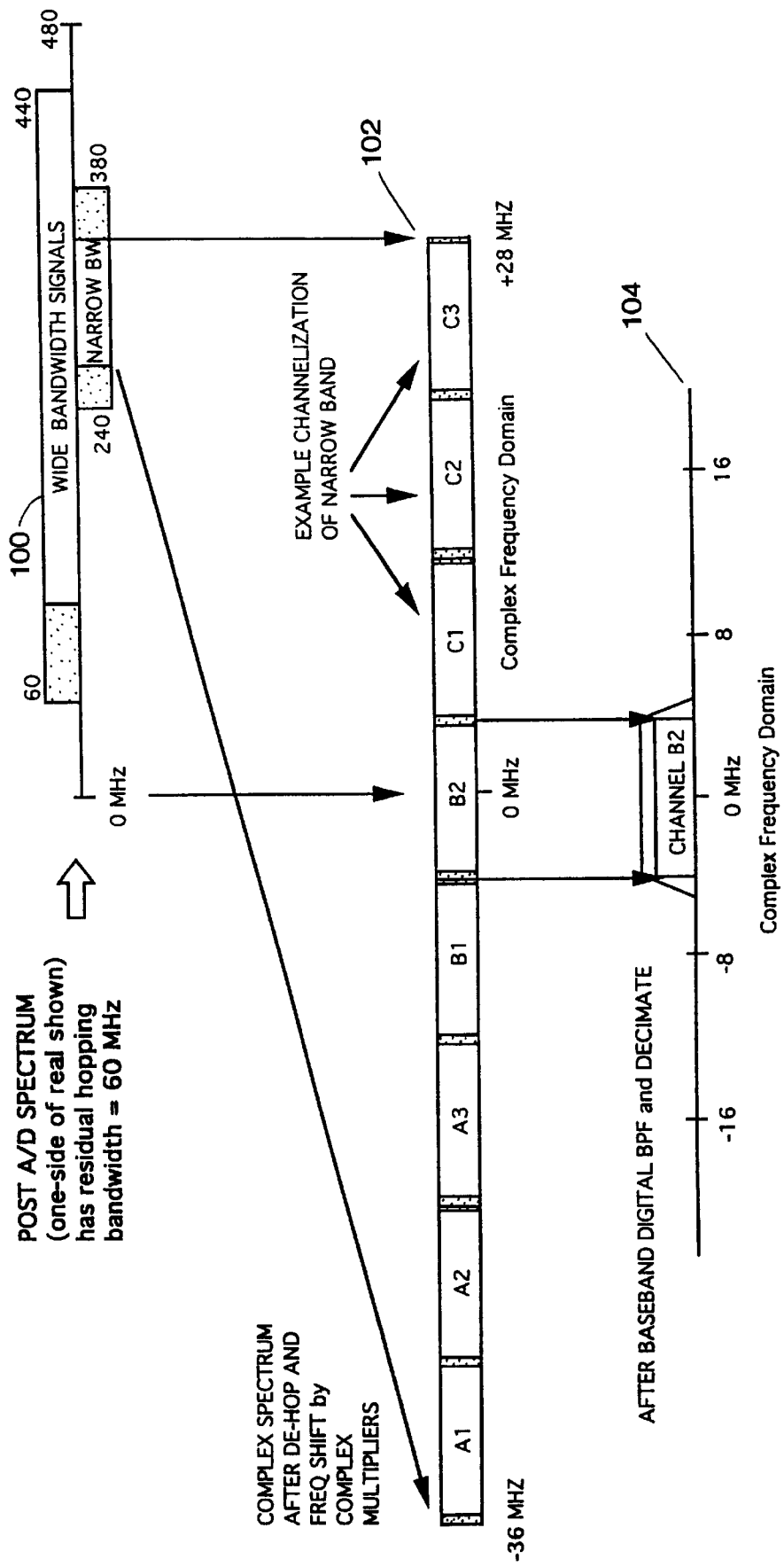
FIG. 4 is a spectral drawing of an example of a digitally dehopped multi-channel narrow band signal spectrum, ready for demodulation processing.

Referring to FIG. 2, the output from the downconverter 22, an analog signal, is applied to the analog digital (A-D) converter 24. A reference signal of 960 MHz is used to set the sample frequency of the A-D converter 24. The output of the A-D converter 24 is applied to a third stage of the downconverter, identified as a digital frequency dehopping circuit 26, which includes a pair of arithmetic multiplication circuits 86 and 88 as well as a DDFS/TUNE module 90. The A-D converter 24 digitizes the second stage IF signal from the downconverter 22. The digital output of the A-D converter 24, for example Model No. AMAD-12, manufactured by TRW Inc., is applied to the arithmetic multipliers 86 and 88 (as implemented in HX3000 gate array logic from Honeywell), and multiplied by the reference digital signal samples from the DDFS/TUNE module 90 which provide fine dehopping of the signal in the digital domain as illustrated in FIG. 4. The Direct Digital Frequency Synthesizer function (DDFS), is well-established prior art. However, as applied to spread spectrum frequency hopped systems, the DDFS output samples sequence is always applied to a digital-to-analog converter circuit in order to synthesize an analog hopping local oscillator signal. In this invention, the DDFS function provides an additional support to demodulation by providing not one but two such digital output sequences, where one is the arithmetic quadrature version of the other. The specific frequency of the output sequences is determined by a tuning command input to the DDFS, from a separate transmission security subsystem, in coordination with the tuning commands supplied to the dual coarse dehopping synthesizer described above. Instead of applying the DDFS output sequences to digital-to-analog converters, the sequences may be applied as the multiplicands to conventional fixed-point or floating point digital multiplier circuits, in order to achieve fine-resolution frequency translation and complete the dehopping process for the received signals of interest. The output sequences from the digital multiplier circuits are applied to digital low-pass filters, which are application-specific with regards to their frequency response characteristics. Typically, the filtering is such that the filter output sequences may be decimated by 2 (discard every other sample). In this manner the signal bandwidth is completely represented in the complex frequency domain at baseband, for the convenience of the subsequent demodulator circuitry. Referring to FIG. 2, the output of the arithmetic multiplier circuits circuits 86 and 88 are applied to the demodulation circuit 27 for signal extraction by way of a pair of low pass and decimate circuits 87 and 89. The choice of digital arithmetic representation, such as number of bits of mantissa, number of bits of exponent, etc. is a design vs. performance matter and not intended to be a subject of this invention. Typically, the digital samples from the analog-to-digital converter, as applied to the digital multiplier circuit, will be on the order of 8 to 12 bits in integer two's complement representation.

The time instants, at which the frequency of the DDFS output sequence changes, are determined by the same master time reference source as mentioned earlier for the coarse dehop synthesizers. In any particular application, synchronization of all frequency dehopping functions may require delayed time epochs to some circuits, in order to compensate for propagation and processing delays to the signals through the system.

FIG. 4 is an exemplary spectral diagram of a digitally de-hopped narrow band signal spectrum ready for demodulation processing. The spectrum 100 represents the output signals from the A/D converter 24 (FIG. 2) with residual de-hopping of, for example, 60 MHz. The spectrum 102 represents the complex spectrum after frequency dehopping and frequency shifting by the arithmetic multiplication circuits 86 and 88. The spectrum 104 illustrates the output signal of the low pass and decimate circuits 87 and 89.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A frequency dehopping circuit for dehopping spread spectrum communication signals, the circuit comprising:
   a first circuit for providing first coarse frequency dehopping of the spread spectrum communication signals and providing first predetermined intermediate frequency signals;
   a second circuit for providing coarse frequency dehopping of said first intermediate frequency signals and providing second intermediate frequency signals; and
   a third circuit for providing fine dehopping of said second intermediate frequency signals.

2. The frequency dehopping circuit as recited in claim 1, wherein said third circuit includes an analog to digital converter for converting said second intermediate frequency signals to digital signals to enable said fine dehopping to be done digitally.

3. The frequency dehopping circuit as recited in claim 1, wherein said first circuit includes a first mixer for reducing the bandwidth of said spread spectrum communication signals.

4. The frequency dehopping circuit as recited in claim 3, wherein said first circuit also includes a tone generator for generating a plurality of tones of different frequencies.

5. The frequency dehopping circuit as recited in claim 4, further including first enabling means for selectively applying said plurality of tones to said first mixer.

6. The frequency dehopping circuit as recited in claim 3, further including one or more reference signals having predetermined frequencies and means for selectively enabling said reference signals to be selectively applied to said first mixer.

7. The frequency dehopping circuit as recited in claim 5, wherein said first enabling means includes a programmable switch for selectively enabling said tones to be applied to said first mixer.

8. The frequency dehopping circuit as recited in claim 1, wherein said second circuit includes a second mixer and a tone generator for generating a plurality of tones of different frequencies.

9. The frequency dehopping circuit as recited in claim 8, further including second enabling means for selectively applying said plurality of tones to said second mixer.

10. The frequency dehopping circuit as recited in claim 1, further including a second mixer, one or more reference signals and second enabling means for selectively enabling said reference signals to be selectively applied to said second mixer.

11. The frequency dehopping circuit as recited in claim 10, wherein said second enabling means includes a programmable switch for selectively enabling said reference signals to be applied to said second mixer.

12. A method for frequency dehopping spread spectrum communication signals, the method comprising the steps of:
   (a) coarse dehopping of the spread spectrum communication signals to provide a reduced bandwidth of said spread spectrum communication signals in order to provide first intermediate frequency signals;
   (b) coarse frequency dehopping of said first intermediate frequency signals to provide reduced bandwidth second intermediate frequency signals;
   (c) converting said second intermediate frequency signals to digital signals; and
   providing fine dehopping of said digital signal.

13. A receiver for receiving spread spectrum communication signals, the receiver comprising:
   a first mixer stage for downconverting that incoming spread spectrum communication signal to a first intermediate frequency signal having a bandwidth less than said incoming spread spectrum incoming communication signal;
   a second mixer stage cascaded to said first mixer stage for down converting said first intermediate frequency signal to a second intermediate frequency signal having a bandwidth less than the bandwidth of said first intermediate frequency signal;
   a third mixer stage for providing fine dehopping of said second intermediate frequency signal, said third stage defining an output signal; and
   a demodulator circuit for demodulatirg said output signal.

14. The receiver as recited in claim 13 further including an analog to digital converter for converting said second intermediate frequency signal to a digital signal.

* * * * *